United States Patent
Pfadler et al.

(10) Patent No.: US 11,962,445 B2
(45) Date of Patent: Apr. 16, 2024

(54) DIFFERENTIAL POWER ANALYSIS FOR OTFS PILOT INTERFERENCE DETECTION

(71) Applicant: VOLKSWAGEN AKTIENGESELLSCHAFT, Wolfsburg (DE)

(72) Inventors: Andreas Pfadler, Berlin (DE); Guillaume Jornod, Berlin (DE)

(73) Assignee: VOLKSWAGEN AKTIENGESELLSCHAFT (DE)

( * ) Notice: Subject to any disclaimer, the term of this patent is extended or adjusted under 35 U.S.C. 154(b) by 0 days.

(21) Appl. No.: 17/755,890

(22) PCT Filed: Nov. 9, 2020

(86) PCT No.: PCT/EP2020/081535
§ 371 (c)(1),
(2) Date: May 11, 2022

(87) PCT Pub. No.: WO2021/099169
PCT Pub. Date: May 27, 2021

(65) Prior Publication Data
US 2022/0385508 A1    Dec. 1, 2022

(30) Foreign Application Priority Data
Nov. 19, 2019  (EP) .................... 19210037

(51) Int. Cl.
*H04L 27/26* (2006.01)
*H04J 11/00* (2006.01)
*H04L 5/00* (2006.01)

(52) U.S. Cl.
CPC ...... *H04L 27/2602* (2013.01); *H04J 11/0023* (2013.01); *H04L 5/0048* (2013.01); *H04L 27/26532* (2021.01); *H04L 27/2666* (2013.01)

(58) Field of Classification Search
CPC ............ H04L 27/2602; H04L 5/0048; H04L 27/26532; H04L 27/2666; H04J 11/0023
(Continued)

(56) References Cited

U.S. PATENT DOCUMENTS 8,559,491 B2    10/2013   Chevalier et al.
10,411,843 B2*   9/2019   Rakib ................. H04L 27/2639
(Continued)

FOREIGN PATENT DOCUMENTS

AU    2015292777 B2    1/2016
CN    101821646 A      9/2010
(Continued)

OTHER PUBLICATIONS

Raviteja et al.; Low-complexity iterative detection for orthogonal time frequency space modulation; Proc. IEEE Trans. Wireless Commun.; Oct. 2018; vol. 17, No. 10; pp. 6501-6515.
(Continued)

*Primary Examiner* — Emmanuel Bayard
(74) *Attorney, Agent, or Firm* — Barnes & Thornburg LLP (57) ABSTRACT

A method for detecting OTFS pilot interference including receiving delay-Doppler-domain samples of a received OTFS delay-Doppler frame, wherein the delay-Doppler domain samples are derived by a two-dimensional symplectic Fourier transformation of time-frequency domain samples resulting from sampling a time-varying received OFTS coded signal; summing the squares of the amplitudes of the delay-Doppler domain samples of the delay-Doppler grid positions evaluated for the channel estimation to establish the received non-interfering pilot power; summing the squares of the amplitudes of all the delay-Doppler domain samples of the complete delay-Doppler grid to establish the total received frame power; comparing a pilot power ratio
(Continued)

derived by dividing the non-interfering pilot power by the total received frame power with a guard space ratio derived by dividing the sum of the number of guard and pilot grid spaces in the transmitted OTFS frame by the total number of grid spaces of the transmitted OTFS frame.

13 Claims, 8 Drawing Sheets

(58) Field of Classification Search
USPC .................................................. 375/260, 262
See application file for complete search history.

(56) References Cited

U.S. PATENT DOCUMENTS

| | | | |
|---|---|---|---|
| 10,666,314 B2 | 5/2020 | Hadani et al. | |
| 10,693,581 B2 | 6/2020 | Rakib et al. | |
| 10,749,651 B2 | 8/2020 | Hebron et al. | |
| 11,038,733 B2 | 6/2021 | Hadani et al. | |
| 2017/0078054 A1 | 3/2017 | Hadani et al. | |
| 2019/0012909 A1 | 1/2019 | Mintz | |
| 2019/0044682 A1* | 2/2019 | Hebron | H04L 25/0202 |
| 2019/0182083 A1* | 6/2019 | Ashrafi | H04L 25/03834 |
| 2019/0238189 A1 | 8/2019 | Delfeld et al. | |
| 2019/0379422 A1* | 12/2019 | Hadani | H04L 5/006 |
| 2020/0259692 A1* | 8/2020 | Hadani | H04L 27/18 |
| 2020/0287672 A1* | 9/2020 | Namboodiri | H04L 27/1566 |
| 2021/0250138 A1* | 8/2021 | Ibars Casas | H04W 72/20 |
| 2022/0086694 A1* | 3/2022 | Kons | H04W 16/02 |
| 2022/0158780 A1* | 5/2022 | Namboodiri | H04L 5/0023 |
| 2022/0321181 A1* | 10/2022 | Hadani | H04B 7/024 |

FOREIGN PATENT DOCUMENTS

| | | | | |
|---|---|---|---|---|
| CN | 102970270 A | 3/2013 | | |
| CN | 106716824 A | 5/2017 | | |
| CN | 108141294 A | 6/2018 | | |
| CN | 108370355 A | 8/2018 | | |
| CN | 108781160 A | 11/2018 | | |
| CN | 109348739 A | 2/2019 | | |
| CN | 109845102 A | 6/2019 | | |
| CN | 109922020 A | 6/2019 | | |
| WO | WO-2018191309 A1 * | 10/2018 | | H04L 25/022 |
| WO | WO-2019051427 A1 * | 3/2019 | | H04L 27/2608 |
| WO | WO-2019157230 A1 * | 8/2019 | | H04B 7/024 |

OTHER PUBLICATIONS

Raviteja et al.; Embedded Pilot-Aided Channel Estimation for OTFS in Delay-Doppler Channels; IEEE Transactions on Vehicular Technology; May 2019; vol. 68, No. 5.

Shen et al.; Channel estimation for Orthogonal Time Frequency Space (OTFS) Massive MIMO; IEEE Transactions on Vehicle Technology; Aug. 15, 2019; vol. 67, No. 16.

Search Report for European Patent Application No. 19210037.8; May 26, 2020.

Search Report for International Patent Application No. PCT/EP2020/081535; Feb. 1, 2021.

Office Action; Chinese Patent Application No. 202080080177.0; Nov. 23, 2023.

* cited by examiner

Tx symbols: ▫: pilot symbol; ○: guard symbol; ×: data symbol

FIG. 1a

Rx symbols: ▽: data detection symbol; ⊞: channel estimation symbol

DIFFERENTIAL POWER ANALYSIS FOR OTFS PILOT INTERFERENCE DETECTION

PRIORITY CLAIM

This patent application is a U.S. National Phase of International Patent Application No. PCT/EP2020/081535, filed 9 Nov. 2020, which claims priority to European Patent Application No. 19210037.8, filed 19 Nov. 2019, the disclosures of which are incorporated herein by reference in their entireties.

SUMMARY

Illustrative embodiments relate to the field of encoding information being transmitted on wireless communication lines. Especially, illustrative embodiments relate to the processing in connection with the newly suggested orthogonal time frequency space (OTFS) modulation with embedded pilot-aided channel estimation in the delay-Doppler domain. Specifically the illustrative embodiments relate to a method and a device for detecting OTFS pilot interference, i.e., interference of the pilot symbol with data symbols in received OTFS delay-Doppler domain frames.

BRIEF DESCRIPTION OF THE DRAWINGS

The disclosed embodiments will be described in more detail with reference to the drawing, in which.

DETAILED DESCRIPTION

The newly proposed OTFS modulation exhibits significant benefits over OFDM modulation currently used in the 4G standard long term evolution (LTE) mobile systems in multipath delay-Doppler channels where each path exhibits a different delay and Doppler shift. The delay-Doppler domain provides an alternative representation of a time-varying channel geometry due to moving objects (e.g., transmitters, receivers, or reflectors) in the scene. Leveraging on this presentation, OTFS multiplexes each information symbol over two-dimensional (2D) orthogonal basis functions, specifically designated to combat the dynamics of time-varying multipath channels. Then the information symbols placed in the delay-Doppler coordinate system or grid can be converted to the standard time-frequency domain used by the traditional modulation schemes such as OFDM. This conversion between the time-frequency domain and the delay-Doppler domain is performed by a two-dimensional symplectic Fourier transform. For example, an inverse symplectic finite Fourier transform (ISFFT) is used in modulation. Consequently, a symplectic finite Fourier transform (SFFT) is used for demodulation, i.e., to transform a time-frequency grid into a delay-Doppler grid.

In a communication using the OTFS modulation symbols are arranged in a two-dimensional grid. In this delay-Doppler domain grid one dimension is associated with a delay of signals due to different transmission paths (delay domain) and the other dimension is associated with the Doppler shift (Doppler domain) occurring during transmission. Thus the delay domain dimension is a time-like dimension in the delay-Doppler domain and the Doppler domain dimension is a frequency-like dimension in the delay-Doppler domain. Symbols associated with the information to be transmitted are arranged in this delay-Doppler grid. Each grid is associated with a frame which are sequentially transmitted. The actual transmission takes place in a time-frequency domain we are used to in actual life. For the sake of clarity in this specification the time-like dimension in the delay-Doppler domain is always called delay dimension and the frequency-like dimension in the delay-Doppler domain Doppler dimension, respectively. The terms time dimension and frequency dimension are thus used only to describe the actual living environment, in which the frame are transmitted sequentially, each in a certain transmission time using different frequency carriers. Thus the time dimension is the dimension in which we measure time and the frequency dimension is that dimension, in which we differentiate frequencies of transmission carriers.

In a multipath delay-Doppler scene it is necessary to know the channel impulse response (CIR) to be able to perform OTFS channel detection or equalization of the channels. Thus a single pilot signal, which is associated with the pilot symbol, is placed in the grid and surrounded by guard symbols in the delay-Doppler domain grid. Guard symbols do not carry any energy. The number of guard symbols is chosen according to the expected maximum delay occurring in any one of the communication paths and the expected Doppler frequency shifts occurring due to the relative movement of the transmitter and receiver and/or reflectors.

In the delay domain the pilot symbol is guarded in each direction up to the absolute amount of the maximum delay.

The Doppler frequency shift (in short also called; Doppler shift) can be positive as well as negative depending on whether receiver and/or transmitter and/or reflector are closing in on each other or separate from each other. Therefore, the pilot symbol has to be guarded on each side parallel to the Doppler dimension by guard symbols to span twice the absolute value of the maximum Doppler frequency shift occurring in one of the paths. Thus in a delay-Doppler grid with N Doppler grid positions and M delay grid positions around the pilot are used for guard symbols. A pilot symbol is placed at (kp,lp), where k is associated with the Doppler dimension position and l is associated with the delay domain position. Thus the guard symbols are placed at (kg,lg) with $k_P-2k_v \leq k \leq k_P+2k_v$, and $l_P-l_\tau \leq l \leq l_P+2l_\tau$, where $k_v$ corresponds to the maximum (expected) Doppler shift and $l_\tau$ corresponds to the maximum (expected) delay occurring in any of the transmission paths. Guard symbols do not carry any intensity, i.e., are null-symbols.

The data symbols are placed outside the guard interval occupied by the guard symbols surrounding the pilot symbol. Under ideal condition this arrangement enables the detection of the channel impulse response. Parts of the energy or intensity of the pilot symbol are "transferred" or "moved" to guard symbol locations in the delay-Doppler domain grid due to the Doppler frequency shifts occurring in the different paths as well as the different delays of the different paths. Thus by evaluating the symbol intensities for the pilot symbol position and parts of the guard symbol positions in the received delay-Doppler domain grid the channel impulse response can be derived. This channel impulse response can then be used to equalize the intensities detected in the different delay-Doppler domain grid positions. This is based on the well-established assumption that all symbols in an delay-Doppler domain grid are affected in the same way by the different path, i.e., show the same channel impulse response. It is thus sufficient to determine the channel impulse response for one transmitted symbol, which is the pilot symbol. This is described in more detail by P. Raviteja, Khao T. Phan and Yi Hong in "Embedded Pilot-Aided Channel Estimation for OTFS in Delay-Doppler Channels", arXiv preprint arXiv:1808.08360 (2018).

The guard interval has to have a size such that none of the pilot symbol intensity will be transferred to data symbol grid space and at the same time that no data symbol intensity will be transferred to guard space positions to which the pilot symbol intensity could be transferred to during transmission. Thus the dimensions of the guard interval, i.e., the number of guard symbols needed, is dependent on the maximum delay occurring in any one of the paths and the maximum Doppler frequency shift occurring in any one of the paths.

These last requirements are not always fulfilled in practical environments. Some of intensity of the pilot symbol may be transferred to data grid positons. When this occurs the pilot symbol interferes with the data symbols. To avoid erroneous information transmission it is desired to detect such pilot interference. Especially, if an adaptive guards symbols arrangement is used, it is beneficiary to detected such a violation to be able adapt the guard symbol arrangement, e.g., increase the guards interval. Disclosed embodiments enable the dynamic detection of OFTS pilot interference. Dynamic in this context means that the interference should/can be detected continuously with the received data, i.e., for each transmitted OTFS-frame.

This achieved by the disclosed method and the disclosed device

The exemplary embodiments disclose a method for detecting OTFS pilot interference comprising: receiving delay-Doppler-domain samples y[k,l] of a received OTFS delay-Doppler frame, associated with a delay-Doppler grid, wherein the grid hat N grid spaces associated with a Doppler dimension quantized in $$\frac{1}{NT}$$

and M grid spaces in the delay dimension quantized in $$\frac{1}{M \cdot \Delta f},$$

wherein M an N are integers, wherein the delay-Doppler domain samples y[k,l] are derived by a two-dimensional Fourier transformation of time-frequency domain samples Y[n,m] resulting from sampling a time-varying received OFTS coded signal N times with a sampling time T and for M frequency subcarriers with a bandwidth resolution of $\Delta f$; summing the squares of the amplitudes of the delay-Doppler domain samples y[k,l] of the delay-Doppler grid positions evaluated for the channel estimation to establish the received non-interfering pilot power $P_{pilot}$; summing the squares of the amplitudes of all the delay-Doppler domain samples y[k,l] of the complete delay-Doppler grid to establish the total received frame power $P_{frame}$; comparing a pilot power ratio $R_{pilotpower}$ derived by dividing the non-interfering pilot power Ppilot by the total received frame power $P_{frame}$ with a guard space ratio $R_{guard\_space}$ derived by dividing the sum of the number of guard and pilot grid spaces in the transmitted OTFS frame by the total number of grid spaces of the transmitted OTFS frame; and produce an interference signal when the comparison indicates a deviation above a tolerable deviation threshold.

Further a device is disclosed for detecting OTFS pilot interference comprising a signal input for receiving delay-Doppler domain samples of a received OTFS delay-Doppler frame associated with a delay-Doppler grid.

Further the disclosed embodiments provide a device for detecting OTFS pilot interference comprising:

a signal input for receiving delay-Doppler-domain samples y[k,l] of a received OTFS delay-Doppler frame, associated with a delay-Doppler grid, wherein $0 \leq k \leq N-1$ and $0 \leq l \leq M-1$ and wherein the grid has N grid spaces associated with a Doppler dimension quantized in $$\frac{1}{NT}$$

and M grid spaces in the delay dimension quantized in $$\frac{1}{M \cdot \Delta f},$$

wherein M an N are integers, wherein the delay-Doppler domain samples y[k,l] are derived by a two-dimensional symplectic Fourier transformation from time-frequency domain samples Y[n,m] resulting from sampling the time-varying received OFTS coded signal N times with a sampling time T and for M frequency subcarriers with a bandwidth resolution of $\Delta f$ each and wherein $0 \leq n \leq N-1$ and $0 \leq m \leq M-1$; and an integration unit for summing the squares of the amplitudes of the received delay-Doppler domain samples y[k,l], which are also evaluated for channel estimation, to establish the received non-interfering pilot power $P_{pilot}$ and for summing the squares of the amplitudes of all the samples y[k,l] of the complete delay-Doppler grid to establish the total received frame power $P_{frame}$; a calculation unit configured to retrieve OFTS transmission parameter comprising information about the number of guard and pilot symbol spaces in the OFTS transmission frame and configured to retrieve the received non-interfering pilot power as well as the total received frame power and configured to calculate a pilot power ratio by dividing the received non-interfering pilot power by the total received frame power as well as to calculate a guard space ratio by dividing the number of guard and pilot symbol spaces in the transmitted OFTS frame by the total number of grid spaces in the transmitted OFTS frame; and a comparator unit for comparing the pilot power ratio with the guard space ration, and an evaluation unit for providing an interference signal when the pilot power ratio and the guard space ration deviate by more than an acceptance threshold.

The benefit is that simple power measurements and calculations lead to a good measure whether interference is present or not.

Never the less the result is accurate and a good indication of interference when it is present, for example, due to deteriorating transmission conditions. Possible errors in the received information can be identified immediately.

The power of the OTFS frame is spread over the entire time span and bandwidth used to transmit the frame in the time-frequency domain signal. Thus it is desired to have a pilot intensity that takes into account to the number and guard and pilot symbols used. The average symbol intensity will be the square root of one divided the total number of grid spaces in the OTFS grid. This assumes that the total Power transmitted is normalized to one. Otherwise the average intensity of a symbol would be the square root of the fraction of the total frame power divided the number of grid spaces. In such a situation, the pilot power may be chosen to be the square root of the number of guard and pilot grid spaces multiplied by the average symbol intensity. Thus the pilot symbol intensity "compensates" the missing intensities of the guard symbols.

$$i_{pilot} = \frac{\sqrt{\text{number of guard and pilot symbols}}}{\sqrt{\text{total number of grid spaces}}}.$$

To ease calculation, the power scales for measuring transmitted or received power may be chosen such that the total power transmitted or received equals unity, respectively.

Once a pilot interference is detected it is beneficial to communicate this to the transmitter. Thus frame parameters, especially the guard interval parameter can be adapted for these subsequently transmitted frames to keep error bit rates low. In at least one disclosed embodiment the information about the detected interference is relayed to the transmitter of the OTFS coded signal.

It is thus suggested by disclosed embodiments that the OTFS parameters for transmitting OTFS-coded frames are adapted by increasing the guard interval when an interference signal is produced. This is, for example, also done by a transmitter spatially coupled to the receiver of the evaluated OFTS frame to guarantee a low error bit rate of responses transmitted.

The device may also comprises a sampling unit to sample the time-frequency domain signal to capture the time-frequency domain samples Y[n,m] used as bases for the transformation to derive the OTFS-symbols [k,l].

The different units of the device can be realized by hard wired electronic circuits or completely or in parts be realized by one or several processing units executing program code.

Figure 1A:
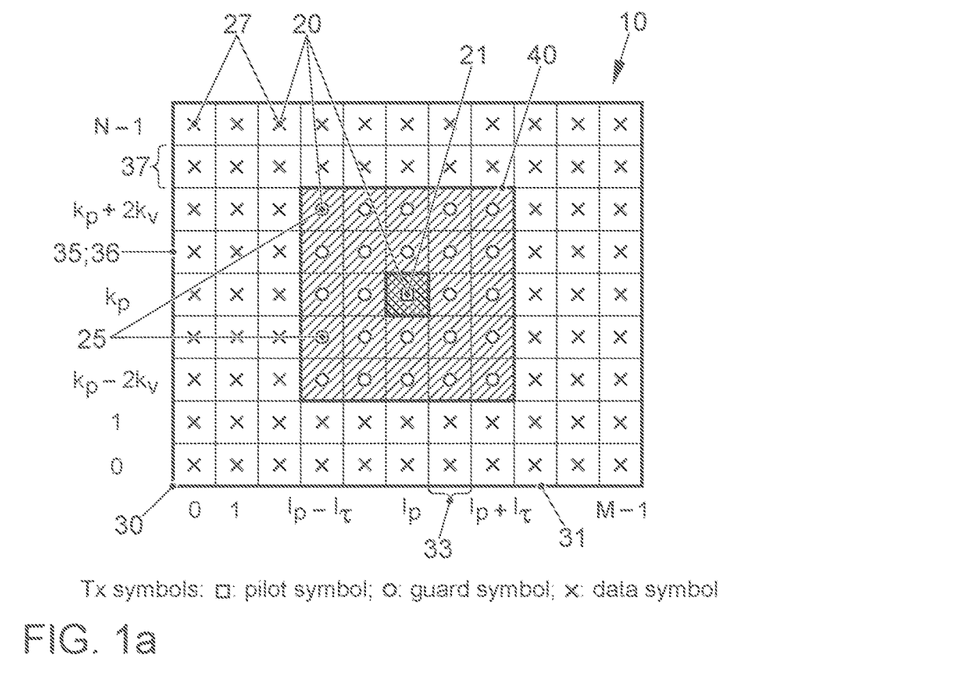
FIG. 1a shows a schematic example of an OTFS transmission frame as a delay-Doppler domain grid.

FIG. 1 shows a graphic representation of an OTFS transmission frame 10 comprising symbols 20 to be transmitted. The OTFS transmission frame 10 depicts a two dimensional grid 30 in the delayed-Doppler domain. One dimension, the abscissa, is associated with a delay basis 31. This dimension is also associated with the delay occurring during transmission. The other dimension, the ordinate, is associated with a Doppler (shift) basis 35. This dimension is also associated with the Doppler frequency shift occurring during transmission.

Along the delay dimension the delay-Doppler grid 30 is divided into M discrete delay intervals 33. Accordingly along the Doppler dimension 36 the delay-Doppler grid 30 is divided into N Doppler intervals 37.

The transmitter symbols 20 arranged in the delay-Doppler domain grid 30 comprise a pilot symbol 21, depicted by the square. During transmission the energy of the pilot symbol 21 is usually partly transferred to other grid positions in the grid 30 of the received delay-Doppler frame 10' (confer to FIG. 1b). Usually the transmitted signal reaches the receiver via multiple different paths. This leads to different delays for the transmitted pilot symbol. In addition different Doppler shifts occur due to the relative motion of the receiver and/or the transmitter and/or reflectors in the different paths. The channel analysis of this energy transfer to the different grid positions in the received OTFS grid (frame) yields the so-called channel impulse response (CIR). The process to establish this OR is called channel estimation.

It is a very good assumption that all symbols in a received delay-Doppler frame (or corresponding grid) are similarly affected by the transmission. Thus the channel impulse response should be equal for all symbols transmitted regardless of the grid position the symbol is arranged in. Thus the channel impulse response needs to be evaluated for one symbol, the pilot symbol, only, to enable equalization of the received intensities for all symbols or grid positions in the received frame.

To enable a correct analysis of the channel impulse response one has to ensure that no energy transfer from other symbols carrying intensity (i.e., data symbols) takes place to those grid positions, to which energy, i.e., intensity, of the pilot symbol 21 is transferred. Also the intensity of the pilot symbol must not be transferred to grid positions used for data symbols. This is insured by placing guard symbols 25, depicted by circles, not having any intensity around the pilot symbol 21 to form a two-dimensional guard interval 40. The guard interval 40 has the rectangular shape.

The remaining grid spaces of the grid 30 outside the two-dimensional guard interval 40 may be used to place data symbols 27 depicted by crosses. The larger the number of data symbols 27 is that can be placed in the delay Doppler domain grid 30 the larger the bandwidth reserved for transmission of information is.

For the further discussion it is assumed that the pilot symbol 21 is located at the grid position (lp,kp). IP denotes the grid position long the delay dimension 32 whereas kp denotes the grid position along the Doppler dimension 37.

lτ corresponds to the number of grid positions needed to ensure that due to delay effects neither energy of the pilot symbol 21 is transferred to any grid position outside the guard interval 40 nor any energy of the data symbols is transferred to guard symbol positions to which the intensity of the pilot symbol could be transferred. The two-dimensional guard interval 40 extends along the delay axis from lp−lτ to lp+lτ.

kv represents the number of Doppler intervals 37 that correspond to the maximum expected Doppler frequency shift. The Doppler frequency shift can transfer intensity of the pilot symbol 21 towards higher frequency as well as towards lower frequencies. Also intensity of data symbols 27 can be transferred to higher and lower frequencies. Therefore, the guard interval along the Doppler dimension 32 extends from kp−2kv to kp+2kv.

The delay-Doppler domain grid 30 depicts one OFTS frame for the orthogonal time frequency and space (OTFS) modulation scheme. The person skilled in the art will appreciate that the delay-Doppler domain grid 30 as depicted in FIG. 1a will be subjected to two-dimensional (inverse) symplectic finite Fourier transformation first. The result of this transformation will be used to actually create the time signal with a Gabor filterbank or also called a Weyl-Heisenberg signaling filterbank and transmitted from the transmitter to the receiver. For these operations, the traditional modulation schemes such as orthogonal frequency division multiplex (OFDM) modulation may also be used. On reception this process is carried out in reverse.

Figure 1B:
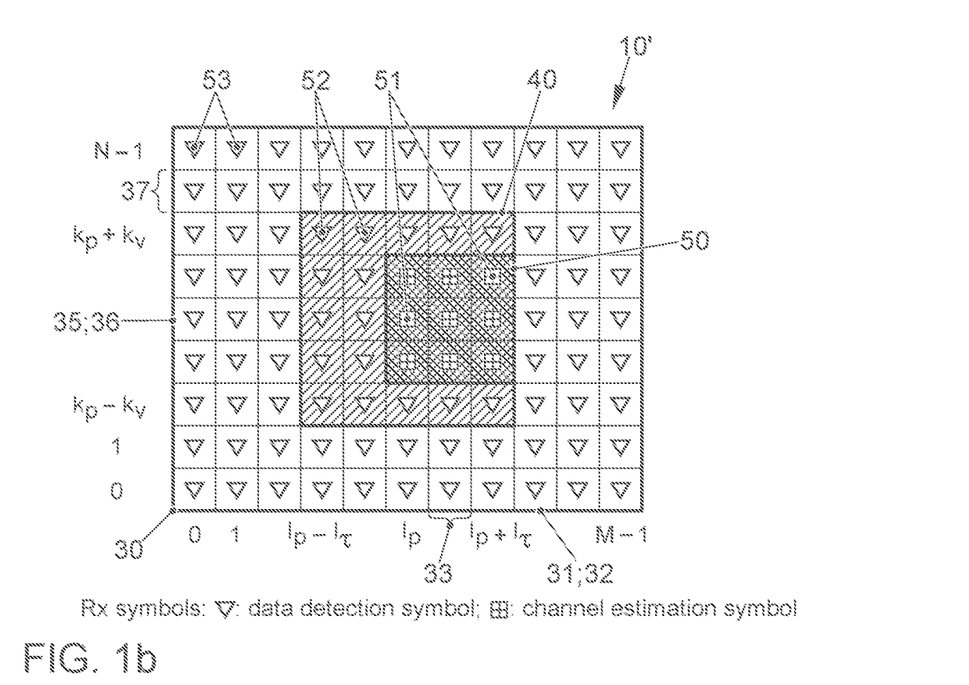
FIG. 1b shows a schematic example of a received OTFS frame as a delay-Doppler domain grid corresponding to the transmitted frame of FIG. 1a indicating the grid positions used for channel estimation and data detection.

FIG. 1b depicts the received OTFS frame 10'. The grid 30 is identical to that of the OTFS transmission frame 10 of FIG. 1a. The same technical features are referred to by the same reference numeral in all figures. In FIG. 1b channel estimation grid spaces 51, into which signal intensity of the pilot symbol might be transferred during transmission due to delay and/or Doppler shifts, are marked each by a square filled with a cross. These constitute a two-dimensional channel estimation area 50 also called guard-pilot space. This two-dimensional channel estimation area 50 comprises the received OTFS samples y[k,l] with kp−kv≤k≤kp+kv and lp≤l≤lp+lτ. Thus the two-dimensional channel estimation area 50 extends from kp−kv to kp+kv along the Doppler dimension and from lp to lp+lτ along the delay dimension. kv represents the maximum Doppler shift expected. lτ represents the maximum delay expected.

The rest of the grid spaces in the "former" two dimensional guard interval 40 are used for data symbol analysis and are called data-guard grid spaces 52. Thus data grid spaces 53 originally assigned to data symbols as well as the guard-data grid spaces 52 are used for retrieving the data received after the CIR has been evaluated.

In use cases the delays and the Doppler shifts sometimes exceed the maximum delay and/or maximum Doppler shift used to determine the guard interval in the OTFS transmission frame 10 depicted in FIG. 1a. Thus it is necessary to detect these situations.

For this purpose the squares of the amplitudes of the received OTFS samples y[k,l] of the channel estimation area are summed and divided by the by the sum of the squares of the amplitudes of all received OFTS samples y[k,l] of the frame. This ratio is called pilot power ratio (RNIPP=$P_{pilot}$). In cases, where there is actually no interference between the pilot symbol and the data symbols, the pilot power, i.e., the pilot power distributed to grid spaces of the channel estimation area 50, normalized to the total received frame power, should be equal to the ratio of the number of grid spaces in the guard interval including the gird space used for the pilot symbol and the total number of grid spaces in the OTFS transmission frame 10. This latter ratio is called the guard space ratio. $R_{guard\_space}=N_{guard\_interval\_spaces}/N_{total\_grid\_spaces}$, where $N_{guard\_interval\_spaces}$ is the number of guard interval grid spaces (including pilot symbol grid space (kp,lp)) and $N_{total\_grid\_spaces}$ is the total number of grid spaces in the OTFS transmitter frame 10.

Figure 1C:
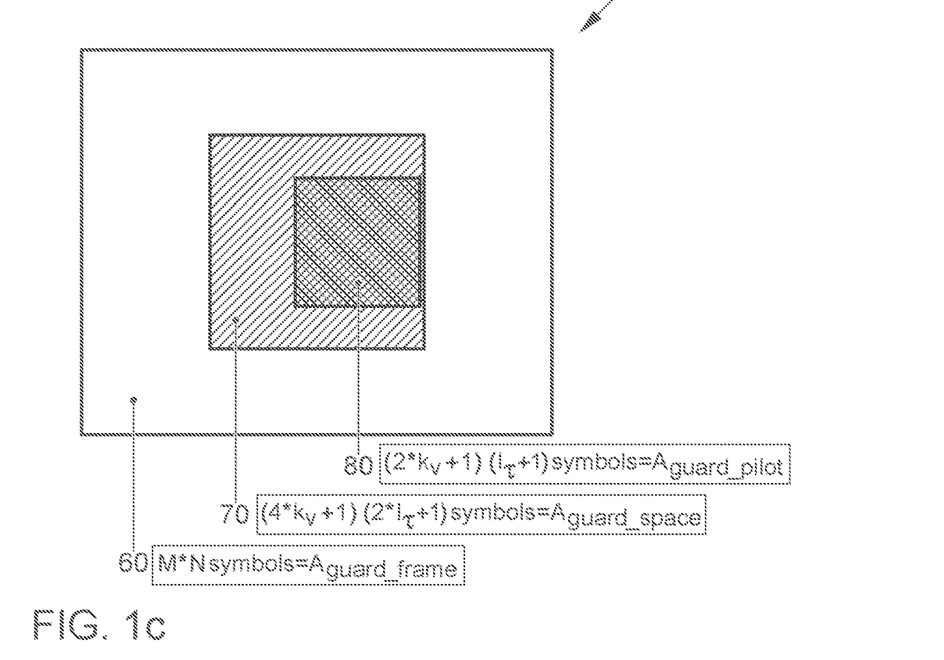
FIG. 1c shows a schematic drawing of the delay-Doppler domain OTFS transmission frame of FIG. 1a highlighting different areas of the OTFS frame.

This guard space ratio is equivalent to the ratio formed by dividing the area of the guard interval $A_{guard\_interval\_space}$ by the total area of the OFTS transmission frame $A_{total\_grid\_space}$, i.e., $R_{guard\_space}=A_{guard\_interval\_space}/A_{total\_grid\_space}$, where $A_{guard\_interval\_space}$ is the area of guard interval grid spaces (including pilot symbol grid space (kp,lp)) and $A_{total\_grid\_space}$ is the total area of all grid spaces in the OTFS transmitter frame 10. In FIG. 1c the OTFS transmission frame 10 is depicted by only showing the area 60 of the total frame, the guard interval area 70 and the channel estimation area 80.

Without pilot interference the pilot power ratio should be equal to the guard space ratio within a tolerable margin or threshold.

Therefor the two ratios (pilot power ratio $R_{pilot\_power}$ and guard space ratio $R_{guard\_space}$ are compared. If they differ by more than the acceptable margin or threshold an interference is detected and an interference signal is produced.

Optionally, this can will in turn be used to adjust the parameters for placing symbols in the OTFS transmission frames sequentially used. For one the transmitter spatially coupled to the receiver performing the analysis that led to the production of the interference signal will adapt its OTFS frames by enlarging the guard space interval 40.

To achieve an adaption by the original transmitter of the evaluated frame the information about the interference signal is relay to the transmitter. Optionally, this is done be sending back the information via a return OTFS frame etc.

The comparison between the pilot power ratio and the guard space ratio can be accomplished by calculation an error ratio $R_{error}$. This is accomplished by dividing the pilot power ratio $R_{pilotpower}$ by the guard space ratio $R_{guard\_space}$: $R_{error}=R_{pilotpower}/R_{guard\_space}$. Without interference the error ratio $R_{error}$ will be close to 1. With interference present the error ratio increases.

Figure 2A:
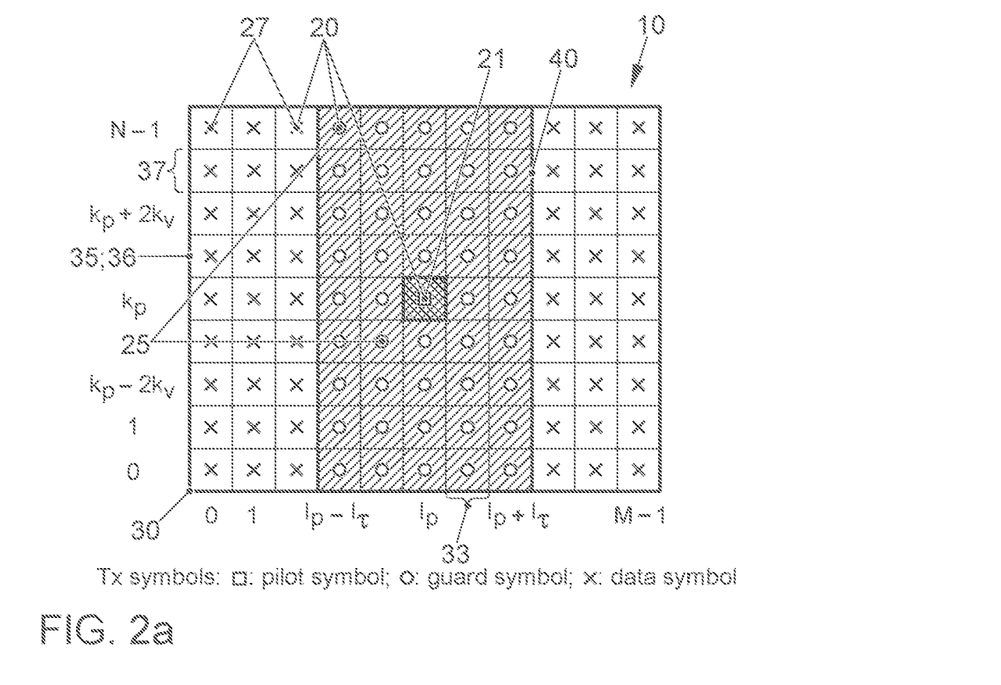
FIG. 2a shows a schematic example of an OTFS transmission frame as a delay-Doppler domain grid with guard symbol extending along the complete Doppler dimension.
Figure 2B:
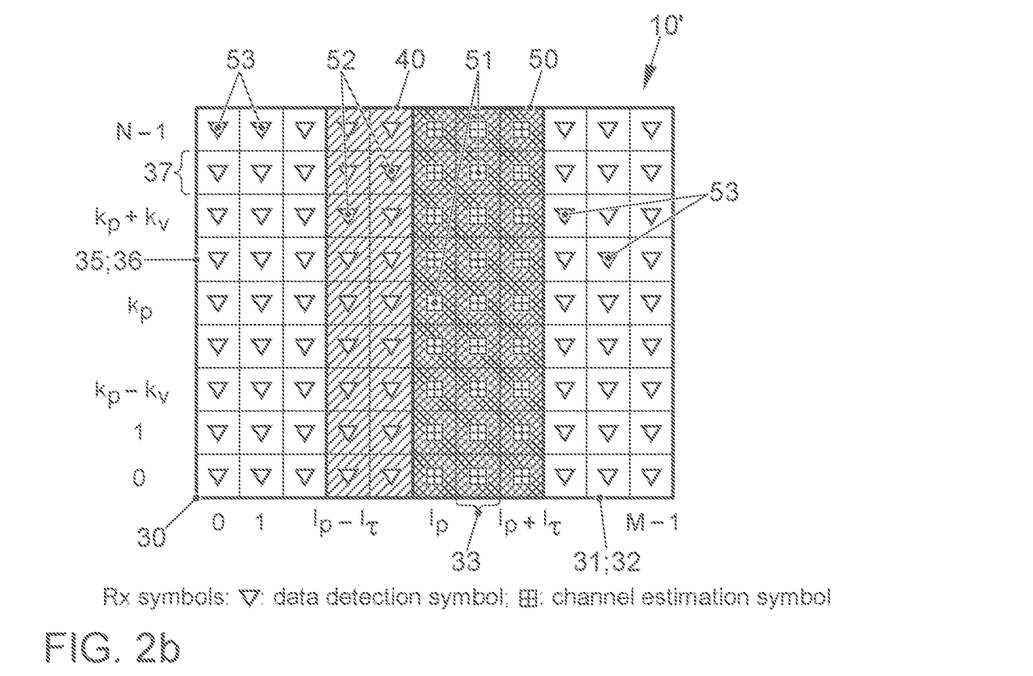
FIG. 2b shows a schematic example of a received OTFS frame as a delay-Doppler domain grid corresponding to the transmitted frame of FIG. 2a indicating the grid positions used for channel estimation and data detection.
Figure 2C:
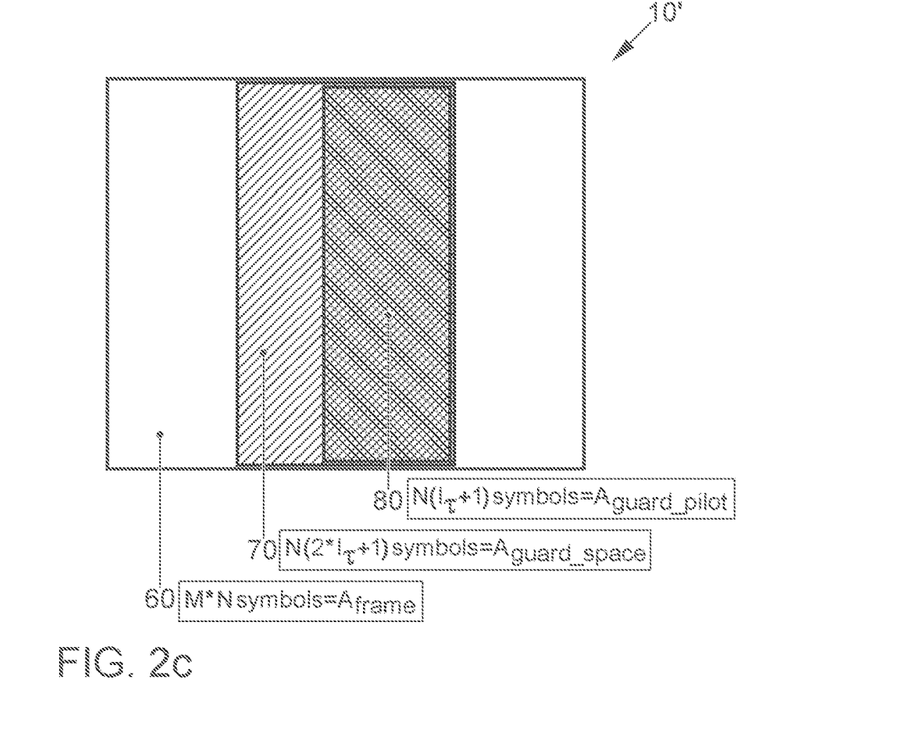
FIG. 2c shows a schematic drawing of the delay-Doppler domain OTFS transmission frame of FIGS. 2a and 2b highlighting different areas of the OTFS frame.

In FIGS. 2a, 2b, and 2c an OTFS transmission frame 10, the received OTFS frame 10' and the OTFS transmission frame 10 are depicted, respectively. FIG. 2c shows the channel estimation area 50 and the guard interval 40 for a situation where the guard interval 40 spans the complete Doppler dimension. The detection of an interference is carried out identically by establishing the pilot power ration and the guard space ratio and compare them to each other.

Figure 3A:
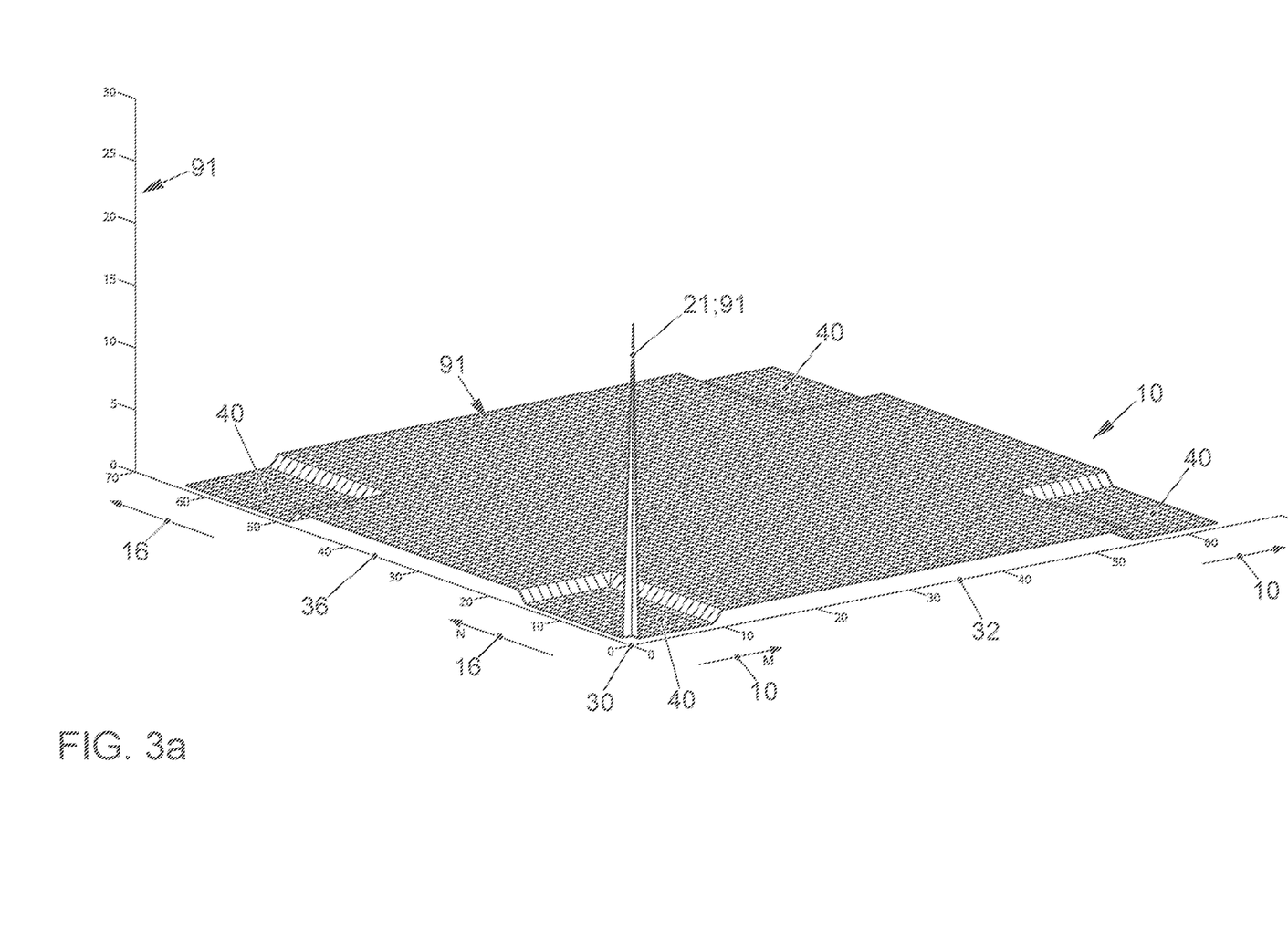
FIG. 3a shows a graph of the intensities of the symbols in a 64 by 64 OTFS transmission frame with Doppler guard interval dimension of ±16 (total of 32) and a delay interval dimension of ±10 (total of 20)

FIG. 3a shows a graph depicting the signal intensities 91 for the different symbols 20 in an OTFS transmission frame 10. The frame 10 consist is a 64 by 64-grid. The pilot symbol 21 is located at (0,0). The guard interval spans ±16 grid spaces in the Doppler-dimension and ±10 grid spaces in the delay domain. The distribution of intensity due to delay and/or Doppler shifts is cyclic. Thus even though the guard interval seems to be split up in four parts it is one contiguous guard interval 40.

Figure 3B:
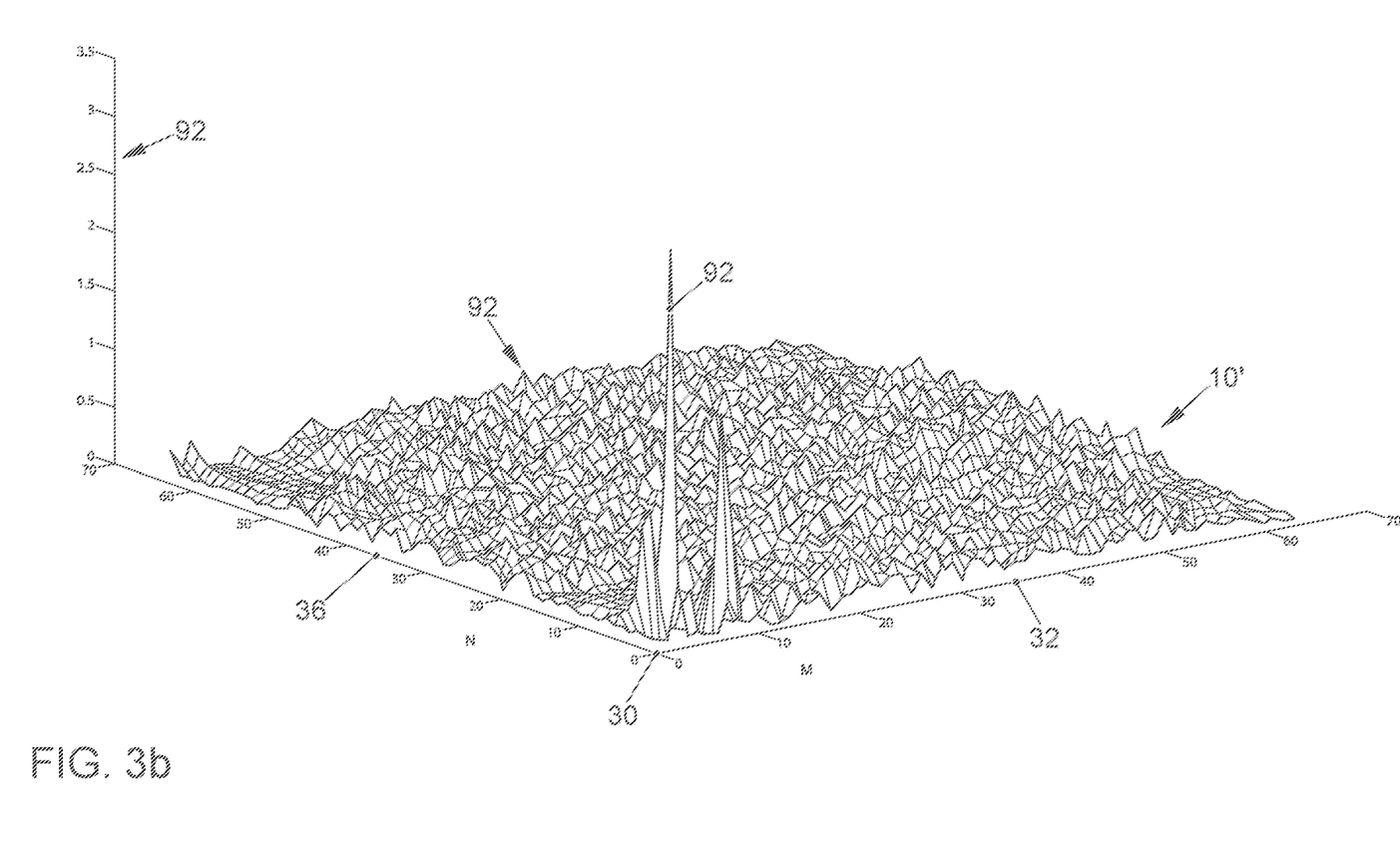
FIG. 3b shows a graph of the intensities of the received 64 by 64 OTFS frame corresponding to the transmitted frame of FIG. 3a, wherein the guard interval size of the transmitted OTFS frame of FIG. 3a is insufficient for the transmission environment.

FIG. 3b depicts a graph of the received intensities 92 of the received OTFS frame 10'. The transmission scenario is such that the guard interval 40 in the OTFS transmission frame 10 (depicted in FIG. 3a) is not adequate to prevent pilot interference with data symbols. In FIG. 3b almost all or at least many of the "former" guard interval grid spaces show a significant received intensity comparable to the intensity received at original "data" grid spaces, at which data symbol were placed. There is no distinct boundary visible coinciding with the original guard interval boundary.

The error ratio is 1.4952, i. e. roughly one and a half. This indicates an usually unacceptable pilot interference leading to a high error bit rate.

Figure 4A:
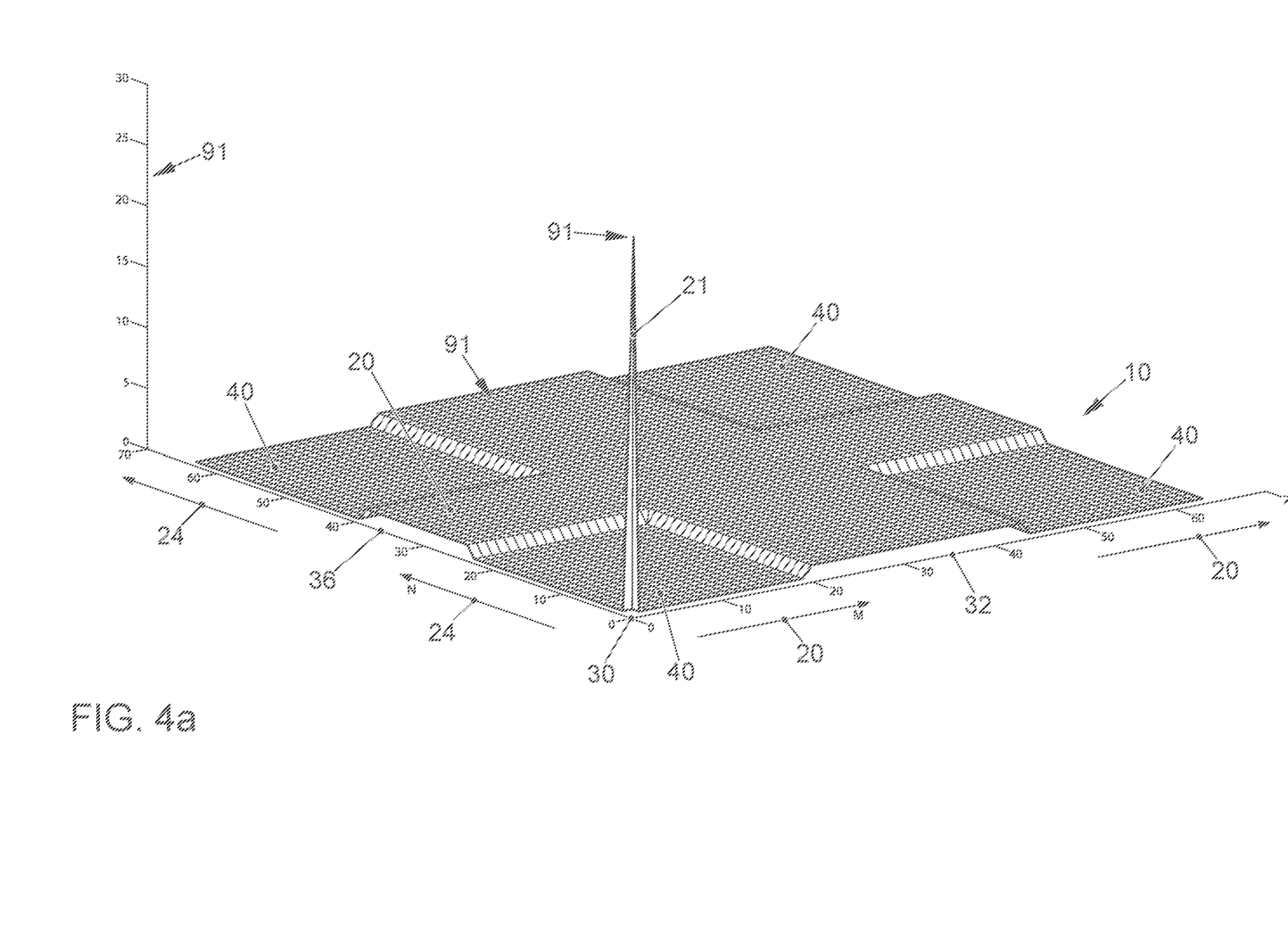
FIG. 4a shows a graph of the intensities of a 64 by 64 OTFS transmission frame with Doppler guard interval dimension of ±24 (total of 48) and a delay interval dimension of ±20 (total of 40)
Figure 4B:
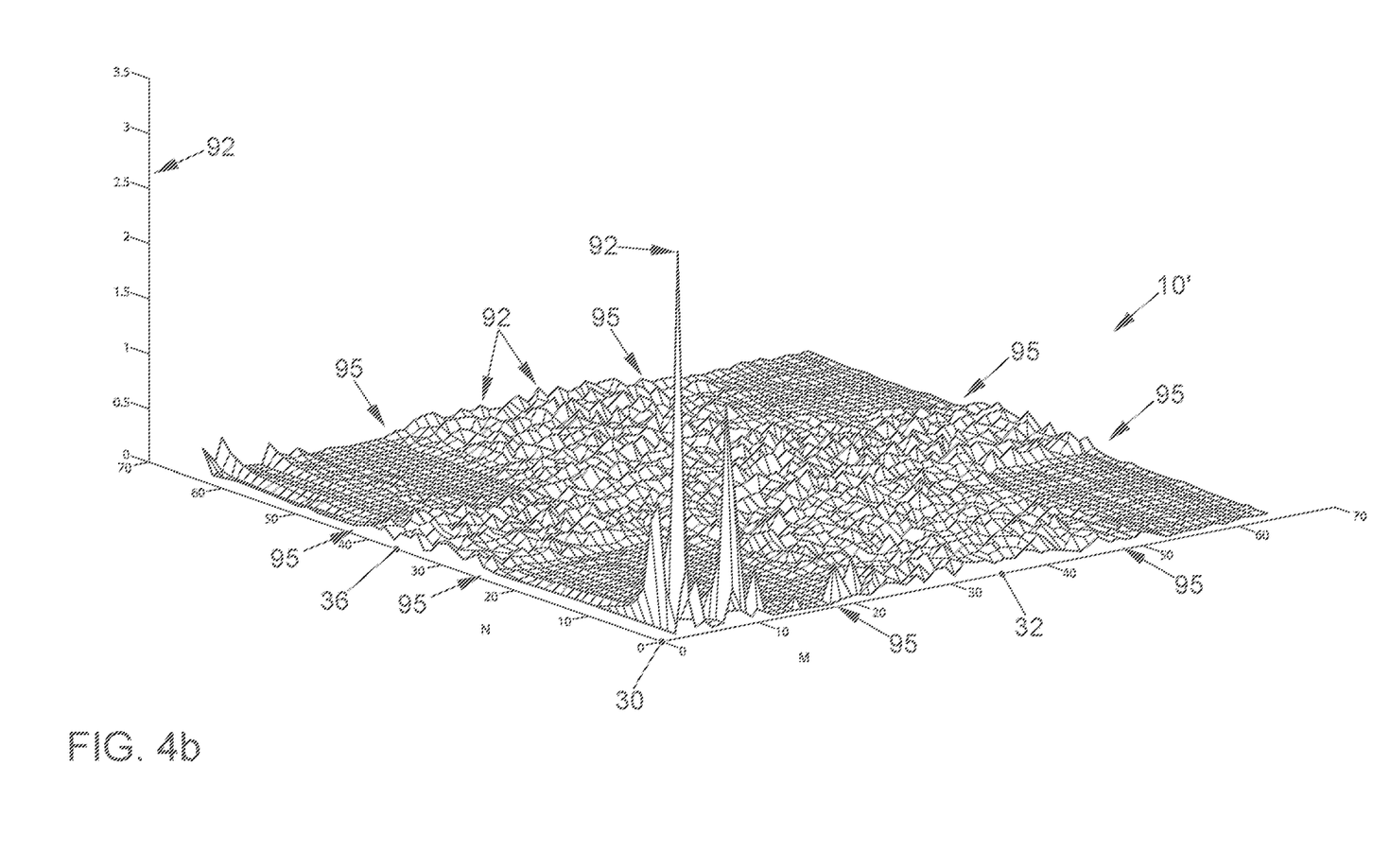
FIG. 4b shows a graph of the intensities of the received 64 by 64 OTFS frame corresponding to the OFTS transmission frame of FIG. 4a, wherein the guard interval size of the OFTS transmission frame of FIG. 4a is sufficient for the transmission environment.

FIG. 4a show a graph of the intensities 91 of the different symbols 20 in an OTFS transmission frame 10 similar to the one of FIG. 3a but with an enlarged guard interval 40. It spans ±24 grid spaces in the Doppler-dimension and ±20 grid spaces in the delay domain. FIG. 4b shows the respective received OTFS frame 10' for the same transmission environment as for the situation of FIGS. 3a and 3b. In this second case with the enlarged guard interval 40 the boundaries 95 of the original guard interval are clearly visible. The error ratio in this case is 1.1713, i.e., close to one.

This shows that the error ratio is a good measure to detect interference of the pilot with the data symbols. In other words the comparison of the pilot power ratio with the guard space ratio is a favorable method to detect pilot interference in OTFS transmission.

Figure 5:
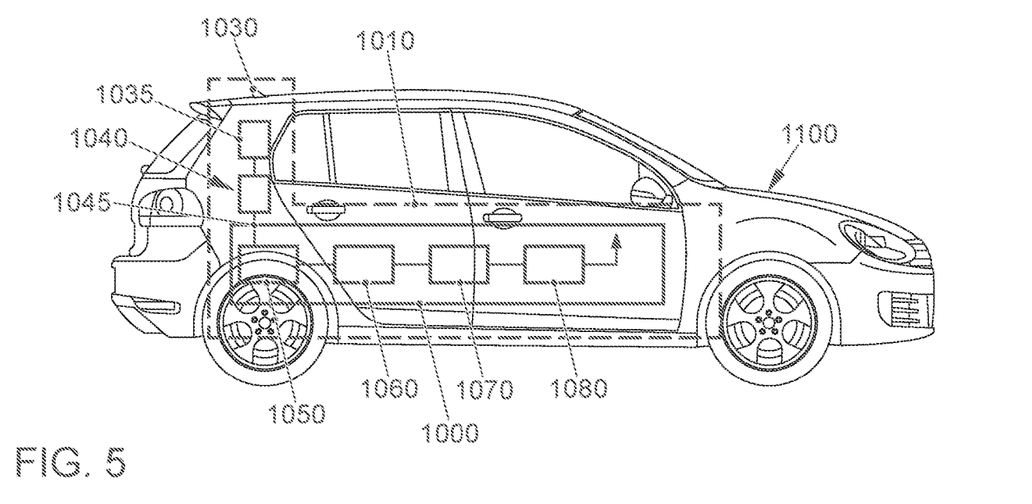
FIG. 5 shows a schematic drawing of a device for dynamically detecting pilot interference.

FIG. 5 shows schematically a device 1000 to dynamically detect pilot interference in an OFTS transmission. The device 1000 is, for example, integrated in mobile communication device 1010 of a transportation vehicle 1100

The communication device 1010 comprises transceiver 1020 for mobile communication coupled to an antenna 1030. The transceiver is coupled to a sampling unit to sample the time-frequency domain signal to capture the time-frequency domain samples Y[n,m] of an OTFS coded signal. For an N by M OFTS frame $0 \leq n \leq N-1$ and $0 \leq m \leq M-1$. The sampling unit samples with a sampling time T and a frequency resolution of $\Delta f$. Thus an OTFS frame is transmitted in a time span of length $N \cdot T$ with a bandwidth of $M \cdot \Delta f$. A transformation unit 1040 transforms the time-frequency domain samples Y[n,m] to received delay-Doppler domain samples y[k,l] with $0 \leq k \leq N-1$ and $0 \leq l \leq M-1$. The received delay-Doppler domain samples y[k,l] are transferred to an input 1045 of the device 1000.

An integration unit 1050 sums the squares of the amplitudes of the received delay-Doppler domain samples that are evaluated for channel estimation. This establishes the received non-interfering pilot power $P_{pilot\_power}$:

$$P_{pilot\_power} = \sum_{k=k_p-k_U}^{k_p+k_U} \sum_{l=l_p}^{l_p+l_\tau} y^2[k, l]$$

Further the integration unit 1050 sums the squares of the amplitudes of all the samples y[k,l] over the complete received delay-Doppler frame to establish the total received frame power $P_{Frame}$:

$$P_{frame} = \sum_{k=0}^{N-1} \sum_{l=0}^{M-1} y^2[k, l]$$

A calculation unit 1060 receives non-interfering pilot power as well as the total received frame power and calculates the pilot power ratio by dividing the received non-interfering pilot power $P_{pilot\_power}$ by the total received frame power $P_{frame}$. The calculation unit 1060 is also configured to retrieve the OFTS frame parameters, comprising information about the guard interval. The calculation unit further calculates the guard space ration $R_{guard\_space}$ by dividing the number of grid spaces used for guard symbols and the pilot symbol by the number of total grid spaces in the OFTS transmission frame.

$$R_{guard\_space} = \frac{\sum_{k=k_p-2k_U}^{k_p+2k_U} \sum_{l=l_p-l_\tau}^{l_p+l_\tau} 1}{\sum_{k=0}^{N-1} \sum_{l=0}^{M-1} 1}$$

A comparator unit 1070 compares the pilot power ratio $R_{pilot\_power}$ with the guard space ration $R_{guard\_space}$. This can be down by comparing an error ratio $R_{error}$ established by dividing the pilot power ratio $R_{pilot\_power}$ by the guard space ratio $R_{guard\_space}$ with one.

$$R_{error} = \frac{R_{pilot\_power}}{R_{guard\_space}}$$

The comparator unit 1070 may, for example, provide the difference of the error ratio $R_{error}$ to unity to an evaluation unit 1080 which evaluates whether this difference is larger than a tolerable deviation threshold. Some deviation is expected due to noise etc. In case the difference is larger than the tolerable deviation threshold an interference signal 1090 is produced an provided. This signal can trigger that the coding of reply OFTS frames use different parameters with regard to the guard interval to ensure that no interference occurs. Thus the guard interval is enlarged. The information about the interference detected, indicated by the interference signal 1090 is also relayed to the transmitter of the original OFTS coded signal, to ensure the use of an adapted guard interval for subsequently sent OTFS frames.

REFERENCE NUMERALS

10 OTFS transmission frame
10' received OTFS frame
20 symbol to be transmitted
21 pilot symbol
25 guard symbols
27 data symbols
30 delay-Doppler domain grid
31 delay basis
32 delay dimension
33 delay interval
35 Doppler basis
36 Doppler dimension
37 Doppler interval
40 two-dimensional guard interval
50 channel estimation area/guard-pilot area
51 channel estimation grid spaces
52 data-guard grid spaces
53 data grid spaces
60 area of the grid spaces/frame
70 guard interval area
80 channel estimation area
91 intensities of symbols in an OTFS transmission frame
92 intensities of symbols in an received OTFS frame
95 boundary of guard interval
1000 device to dynamically detect pilot interference
1010 communication device
1020 transceiver
1030 antenna
1035 sampling unit
1040 transformation unit 1045 input
1050 integration unit
1060 calculation unit
1070 comparator unit
1080 evaluation unit
1090 interference signal
1100 transportation vehicle

The invention claimed is:

1. A method for detecting Orthogonal Time Frequency Space (OTFS) pilot interference, the method comprising:
receiving delay-Doppler-domain samples y[k,l] of a received OTFS delay-Doppler frame associated with a delay-Doppler grid, wherein the grid has N grid spaces associated with a Doppler dimension quantized in $$\frac{1}{NT}$$

and M grid spaces in the delay dimension quantized in $$\frac{1}{M \cdot \Delta f},$$

wherein M an N are integers, wherein the delay-Doppler domain samples y[k,l] are derived by a two-dimensional symplectic Fourier transformation of time-frequency domain samples Y[n,m] resulting from sampling a time-varying received OFTS coded signal N times with a sampling time T and for M frequency subcarriers with a bandwidth resolution of $\Delta f$;
summing the squares of the amplitudes of the delay-Doppler domain samples y[k,l] of the delay-Doppler grid positions evaluated for channel estimation to establish a received non-interfering pilot power $P_{pilot}$;
summing the squares of the amplitudes of all the delay-Doppler domain samples y[k,l] of a complete delay-Doppler grid to establish a total received frame power $P_{frame}$;
comparing a pilot power ratio $R_{pilot\_power}$ derived by dividing the non-interfering pilot power $P_{pilot}$ by the total received frame power $P_{frame}$ with a guard space ratio $R_{guard\_space}$ derived by dividing the sum of the number of guard and pilot grid spaces $A_{guard\_space}$ in the transmitted OTFS frame by the total number of grid spaces of a transmitted OTFS frame $A_{frame}$; and
producing an interference signal when the comparison indicates a deviation above a tolerable deviation threshold.

2. The method of claim 1, wherein power scales for measuring transmitted or received power are chosen so the total power transmitted or received equals unity, respectively.

3. The method of claim 1, wherein information about the detected interference is relayed to a transmitter of the OTFS coded signal.

4. The method of claim 1, wherein OTFS parameters for transmitting OTFS-coded frames are adapted by increasing a guard interval when an interference signal is produced.

5. The method of claim 1, wherein the pilot power ratio $R_{pilotpower}$ and the guard space ratio $R_{guard\_space}$ are compared by deriving an error ratio $R_{error}$ by dividing the pilot power ratio $R_{pilotpower}$ by the guard space ratio $R_{guard\_space}$ and comparing the error ratio $R_{error}$ with one.

6. A device for detecting Orthogonal Time Frequency Space (OTFS) pilot interference comprising:
a signal input for receiving delay-Doppler-domain samples y[k,l] of a received OTFS delay-Doppler frame, associated with a delay-Doppler grid, wherein $0 \le k \le N-1$ and $0 \le l \le M-1$ wherein the grid has N grid spaces associated with a Doppler dimension quantized in $$\frac{1}{NT}$$

and M grid spaces in the delay dimension quantized in $$\frac{1}{M \cdot \Delta f},$$

wherein M an N are integers, wherein the delay-Doppler domain samples y[k,l] are derived by a two-dimensional symplectic Fourier transformation from time-frequency domain samples Y[n,m] resulting from sampling time-varying received OFTS coded signal N times with a sampling time T and for M frequency subcarriers with a bandwidth resolution of $\Delta f$ each and wherein $0 \le n \le N-1$ and $0 \le m \le M-1$; and
an integration unit for summing the squares of the amplitudes of the received delay-Doppler domain samples y[k,l], which are also evaluated for channel estimation, to establish the received non-interfering pilot power $P_{pilot}$ and for summing the squares of the amplitudes of all the samples y[k,l] of a complete delay-Doppler grid to establish a total received frame power $P_{frame}$;
a calculation unit to retrieve OFTS transmission parameter comprising information about the number of guard symbol spaces and pilot symbol spaces in the OFTS transmission frame and configured to retrieve received non-interfering pilot power $P_{pilot\_power}$ as well as the total received frame power $P_{frame}$ and configured to calculate a pilot power ratio $R_{pilot\_power}$ by dividing the received non-interfering pilot power $P_{pilot\_power}$ by the total received frame power $P_{frame}$ as well as to calculate a guard space ratio $R_{guard\_space}$ by dividing the number of guard and pilot symbol spaces $A_{guard\_space}$ in a transmitted OFTS frame by the total number of grid spaces $A_{frame}$ in the transmitted OFTS frame;
a comparator unit for comparing the pilot power ratio $R_{pilot\_power}$ with the guard space ration $R_{guard\_space}$; and
an evaluation unit for providing an interference signal when the pilot power ratio $R_{pilot\_power}$ and the guard space ration $R_{guard\_space}$ deviate by more than an acceptance threshold.

7. The device of claim 6, further comprising a sampling unit to sample the time-frequency domain signal to capture the time-frequency domain samples Y[n,m].

8. The device of claim 6, further comprising a transformation unit for transforming the time-frequency domain samples Y[n,m] into received delay-Doppler domain samples y[k,l] with $0 \le k \le N-1$ and $0 \le l \le M-1 0 \le n \le N-1 0 \le m \le M-1$.

9. The device of claim 6, wherein the device is part of a communication device of a transportation vehicle.

10. The device of claim 6, wherein power scales for measuring transmitted or received power are chosen so the total power transmitted or received equals unity, respectively.

11. The device of claim 6, wherein information about the detected interference is relayed to a transmitter of the OTFS coded signal.

12. The device of claim 6, wherein OTFS parameters for transmitting OTFS-coded frames are adapted by increasing a guard interval when an interference signal is produced.

13. The device of claim 6, wherein the pilot power ratio $R_{pilotpower}$ and the guard space ratio $R_{guard\_space}$ are compared by deriving an error ratio $R_{error}$ by dividing the pilot power ratio $R_{pilotpower}$ by the guard space ratio $R_{guard\_space}$ and comparing the error ratio $R_{error}$ with one.

* * * * *